(12) United States Patent
Cavalli

(10) Patent No.: US 6,524,515 B1
(45) Date of Patent: Feb. 25, 2003

(54) METHOD OF PRODUCING A VEHICLE STEERING WHEEL

(75) Inventor: Luigi Cavalli, Saronno (IT)

(73) Assignee: Cavalli S.r.l., Cislago (IT)

( * ) Notice: Subject to any disclaimer, the term of this patent is extended or adjusted under 35 U.S.C. 154(b) by 0 days.

(21) Appl. No.: 09/387,679

(22) Filed: Aug. 31, 1999

(30) Foreign Application Priority Data

Sep. 3, 1998 (IT) ........................... TO98A0743

(51) Int. Cl.⁷ .......................... B29C 43/18; B29C 65/70; B29C 70/46
(52) U.S. Cl. ................... 264/449; 264/251; 264/257; 264/258; 264/263; 264/266; 264/271.1; 264/279.1; 264/324; 264/496; 156/245
(58) Field of Search .................. 264/449, 248, 264/250, 251, 252, 229.1, 258, 324, 496, 263, 266, 271.1; 156/245

(56) References Cited

U.S. PATENT DOCUMENTS

| | | | | |
|---|---|---|---|---|
| 4,205,034 A | * | 5/1980 | Newberry | 264/103 |
| 4,473,520 A | * | 9/1984 | Overcashier et al. | 264/101 |
| 4,761,333 A | * | 8/1988 | Takimoto et al. | 428/327 |
| 4,800,775 A | * | 1/1989 | Iuchi | 74/552 |
| 4,849,037 A | * | 7/1989 | Kondo et al. | 156/166 |
| 5,061,418 A | * | 10/1991 | Ware | 264/46.6 |
| 5,129,787 A | * | 7/1992 | Violette et al. | 416/226 |
| 5,204,033 A | * | 4/1993 | Pearce et al. | 264/136 |
| 5,222,297 A | * | 6/1993 | Graff et al. | 29/889.71 |
| 5,656,231 A | * | 8/1997 | Blackmore | 264/408 |
| 5,713,801 A | * | 2/1998 | Aoyama | 473/354 |
| 5,761,968 A | * | 6/1998 | Poteet | 74/558 |
| 5,792,302 A | * | 8/1998 | Nakada et al. | 156/293 |
| 5,840,144 A | * | 11/1998 | Schumacher et al. | 156/267 |
| 5,899,118 A | * | 5/1999 | Satoh et al. | 74/552 |
| 6,039,910 A | * | 3/2000 | Tanaka et al. | 264/248 |
| 6,093,357 A | * | 7/2000 | Bissonette et al. | 264/248 |
| 6,249,970 B1 | * | 6/2001 | Cattaneo | 29/894.1 |

FOREIGN PATENT DOCUMENTS

| | | |
|---|---|---|
| DE | 4039138 | 2/1992 |
| DE | 29802578 | 6/1998 |
| DE | 19746472 | 4/1999 |
| JP | 05-42876 | * 2/1993 |
| WO | 9743164 | 11/1997 |

OTHER PUBLICATIONS

English abstract of WO 97/43164 dated Nov. 20, 1997.
English abstract of DE 4039138 dated Feb. 6, 1992.
English abstract of DE 29802578 dated Jun. 10, 1998.
English abstract of DE 19746472 dated Apr. 29, 1999.

* cited by examiner

Primary Examiner—Stefan Staicovici
(74) Attorney, Agent, or Firm—Ladas & Parry

(57) ABSTRACT

The method provides for forming a supporting structure of the steering wheel, the structure having a metal core and an outer cover layer of polymer material; for each portion of the structure to be covered with valuable material (e.g. brier), two curved preformed half-shells of multilayer composite material are formed of such shape and size as to fit, facing each other, on opposite sides about the corresponding portion of the structure, so as to define a substantially continuous, tubular shell; the portion of the structure is wound, over the outer cover layer, with at least one layer of cloth impregnated with a polymer resin and to which the preformed half-shells are applied; and polymerization of the polymer resin, conducted in a heated mold, ensures adhesion of the half-shells to each other and to the structure. Each portion of the structure also has two diametrically-opposite, circumferential grooves formed in the outer cover layer to permit thermal expansion, without stressing the half-shells, of the polymer material of which the outer cover layer is made.

18 Claims, 2 Drawing Sheets

METHOD OF PRODUCING A VEHICLE STEERING WHEEL

The present invention relates to a new method of producing vehicle steering wheels, and which is particularly suitable for producing steering wheels with a covering of valuable material, e.g. brier; and to steering wheels produced using such a method.

BACKGROUND OF THE INVENTION

In the automotive industry, various types of wooden steering wheels are produced using various methods. One of these consists in producing rings of shaped laminated wood, possibly with a brier veneer, which are fitted to a supporting structure of the steering wheel. Though relatively cheap to make, steering wheels produced this way are unsatisfactory in appearance and normally cannot be made from the same type of wood used for other interior parts of the vehicle (e.g. door panels, dashboard, etc.). Another known method consists in veneering a polymer (typically polyurethane) layer of the steering wheel structure with one or more layers of brier. While providing for a fairly attractive appearance, this method is relatively expensive and, from the manufacturing standpoint, involves serious problems as regards adhesion of the wood veneer to the underlying polymer support, on account of the different chemical and physical properties of the two materials.

The same drawbacks in terms of cost or poor appearance also apply to other known methods of producing wooden or wood-veneered steering wheels.

SUMMARY OF THE INVENTION

It is therefore an object of the present invention to provide a method of producing vehicle steering wheels, which, unlike the above known methods, provides for achieving a highly attractive appearance, in particular matching the other interior parts of the vehicle, and which at the same time is straightforward and cheap to implement.

According to the present invention, there is provided a method of producing vehicle steering wheels, in particular steering wheels with a covering of valuable material; characterized by comprising the steps of:
  forming a supporting structure of a steering wheel, the structure having at least one outer cover layer of a polymer material of predetermined density;
  forming at least one pair of curved preformed half-shells shaped and sized to fit, facing each other, on opposite sides about a predetermined portion of said structure, so as to define a substantially continuous, tubular shell covering said structure portion;
  winding at least one layer of cloth, impregnated with a polymer resin, about said structure portion and over said outer cover layer of the structure;
  applying said at least one pair of preformed half-shells to said at least one layer of impregnated cloth to form said substantially continuous, tubular shell covering said structure portion;
  producing a polymerization reaction of said polymer resin to bond said preformed half-shells to each other and, via the interposition of said at least one layer of cloth, to said outer cover layer of said structure.

Said step of forming said supporting structure of said steering wheel preferably in turn comprises a step of forming in said outer cover layer of said structure at least one recessed portion permitting thermal expansion of said polymer material.

The present invention also relates to a vehicle steering wheel comprising a supporting structure of said steering wheel, the structure having at least one outer cover layer of a polymer material of predetermined density; and characterized by also comprising at least one pair of curved preformed half-shells fitted, facing each other, on opposite sides about at least one corresponding predetermined portion of said structure, or about the whole of the structure, so as to define a substantially continuous, tubular shell covering said structure portion; at least one layer of cloth, impregnated with a polymer resin, being wound about said structure portion, over said outer cover layer of the structure, and being interposed radially between said outer cover layer of said structure and said preformed half-shells.

Said supporting structure of said steering wheel preferably comprises, in said outer cover layer of polymer material, at least one recessed portion permitting thermal expansion of said polymer material.

The present invention therefore provides for producing, at relatively low cost, highly functional vehicle steering wheels with a covering of valuable material, e.g. real wood, and in particular of the same type of wood used for other interior parts of the vehicle (door panels, dashboard, etc.) to achieve a highly attractive effect.

The layer of impregnated cloth interposed between the polymer (e.g. polyurethane) supporting structure and the preformed half-shells (e.g. made of multilayer material with a sandwich structure of wood and cloth impregnated with polymer resin) ensures strong adhesion of the half-shells to each other and to the structure, despite the chemical incompatibility and poor natural adhesion of wood and polyurethane (or similar polymers). Moreover, the recessed portion in the outer cover layer of the structure permits thermal expansion of the polymer material of the outer cover layer without radially compressing the preformed half-shells fitted to the outer cover layer, thus preventing thermal expansion of the structure from deforming, warping or even detaching the half-shells.

Moreover, beneath or together with the layer of impregnated cloth, the steering wheel structure may be wound with an electric resistance heating element, which, being substantially incorporated in the cloth layer, does not raise the overlying layers. The present invention therefore provides for producing, in a straightforward, low-cost manner, heated steering wheels with a wood veneer or covering of other valuable material, and of flawless finish.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
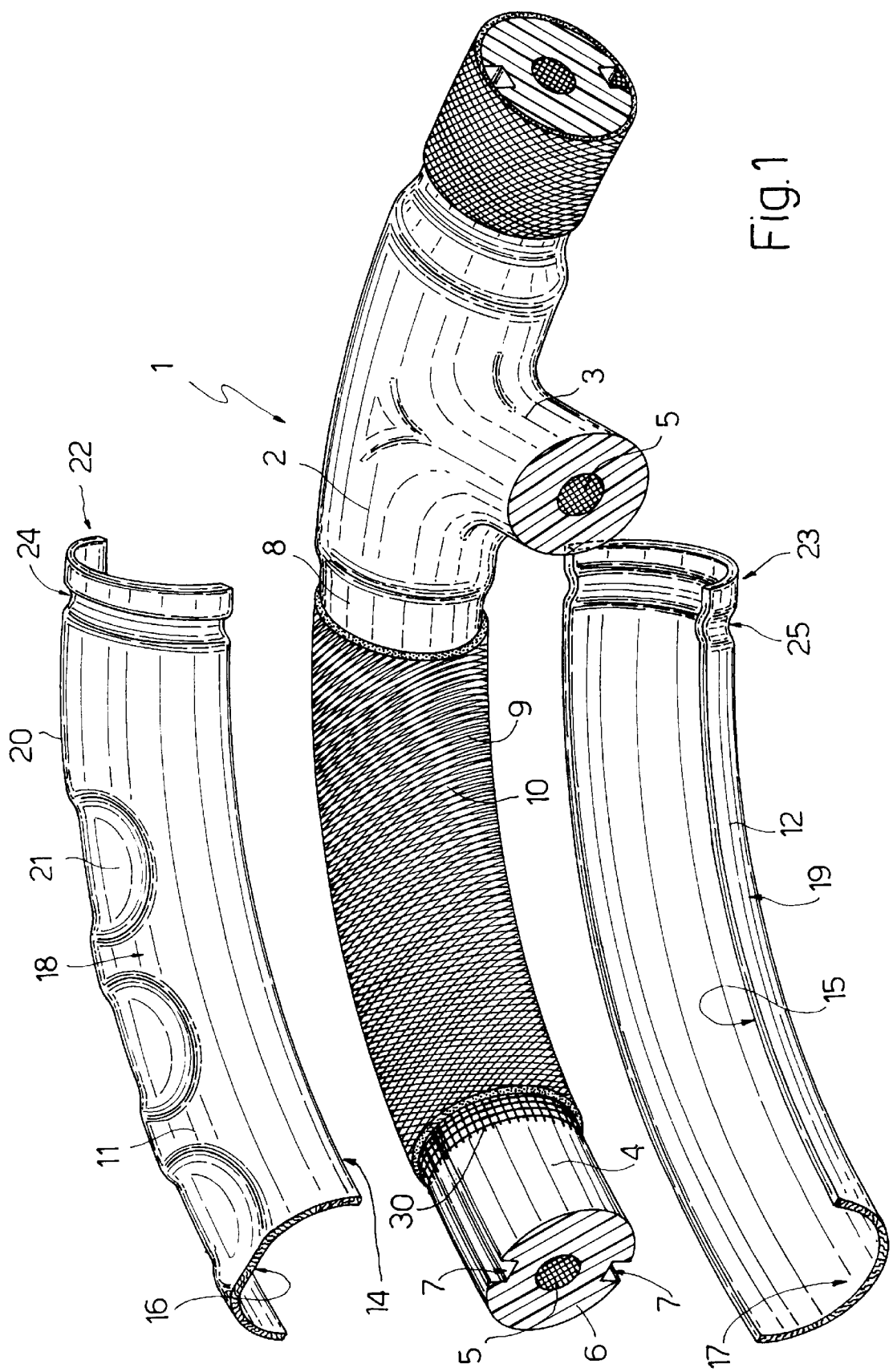
FIG. 1 shows a partial schematic view of a steering wheel in accordance with the invention, in the course of manufacture.
Figure 3:
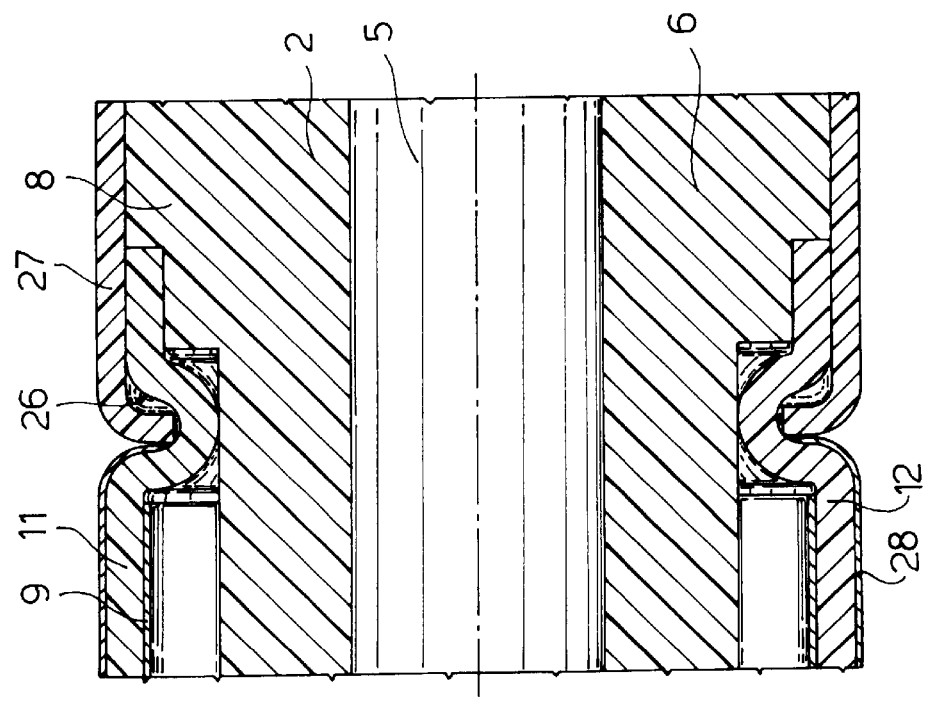
FIG. 3 shows a longitudinal section of a detail of the FIG. 1 steering wheel as assembled.
Figure 2:
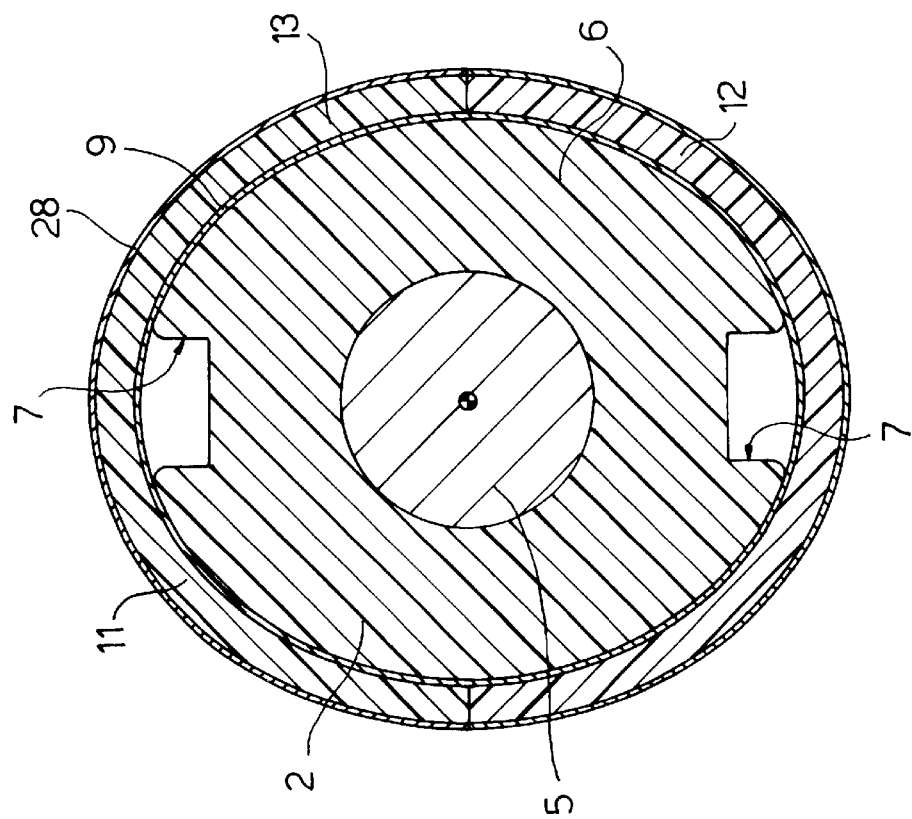
FIG. 2 shows a cross section of the FIG. 1 steering wheel as assembled.

With reference to FIGS. 1 to 3, number 1 indicates as a whole a vehicle steering wheel, in particular for a car. Steering wheel 1 comprises a supporting structure 2 of any shape and having at least one spoke 3 connected integrally to the vehicle steering column (not shown). For the sake of simplicity, reference is made in the following description to only one portion 4 of structure 2, located at spoke 3 and as shown in detail in FIG. 1. It is understood, however, that the following description also applies to any of a number of portions into which structure 2 may be divided, as well as to the whole of steering wheel 1.

Structure 2 in turn comprises a metal core 5 enclosed in an outer cover layer 6 of a polymer material of predetermined density, e.g. low-expansion polyurethane.

According to the invention, outer cover layer 6 of structure 2 comprises at least one recessed portion 7 to permit thermal expansion of the polymer material from which outer cover layer 6 is made: in the example shown, two diametrically-opposite circumferential grooves 7 are formed in outer cover layer 6 and extend along the whole length of portion 4 of structure 2 up to a connecting portion 8 for connection to spoke 3.

At least one layer 9 of cloth 10 impregnated with a polymer resin is wound about portion 4 of structure 2, over outer cover layer 6 of the structure: advantageously, though not necessarily, a commercial glass or polyester gauze impregnated, for example, with epoxy or melamine resin may be used. Over layer 9 of impregnated cloth 10, two curved preformed half-shells 11, 12 are fitted, facing each other, on opposite sides about portion 4 of structure 2 to define a substantially continuous, tubular shell 13 covering portion 4 of structure 2, so that layer 9 of impregnated cloth 10 is interposed radially between outer cover layer 6 of structure 2 and preformed half-shells 11, 12. Half-shells 11, 12 form two symmetrical halves of tubular shell 13, which are separated longitudinally and connected along respective end edges 14, 15 of half-shells 11, 12 to define continuous tubular shell 13, which is arc-shaped in the example shown, and houses structure 2, in particular portion 4 of structure 2, of steering wheel 1. Respective inner lateral surfaces 16, 17 of half-shells 11, 12 are substantially smooth and even, while respective outer lateral surfaces 18, 19 of half-shells 11, 12 may be of any shape, in particular to improve grip of steering wheel 1, and comprise, for example, a succession of ridges 20 and impressions 21 (shown schematically on half-shell 11 in FIG. 1).

Preformed half-shells 11, 12 may be made of known multilayer composite material with a sandwich structure, in particular comprising an inner layer of wood, at least one intermediate layer of cloth impregnated with polymer adhesive, and an outer surface layer—of wood or not—defined for example by a brier veneer or made of kevlar, aluminium or other valuable material.

In the preferred embodiment shown, preformed half-shells 11, 12 comprise, at respective longitudinal ends 22, 23 adjacent to connecting portion 8 for connection to spoke 3, respective transverse seats 24, 25, which, when half-shells 11, 12 are connected to form tubular shell 13, define a continuous annular seat 26 in which to clinch a surface covering 27, e.g. of leather, applied visibly to structure 2 on the opposite side, circumferentially, to half-shells 11, 12, e.g. to cover connecting portion 8 for connection to spoke 3.

Half-shells 11, 12 may, of course, be shaped to comprise portions or cheeks (not shown) extending over all or part of spoke 3 (or all the spokes of steering wheel 1); in which case, clinching seats for surface covering 27, equivalent to seats 24, 25 described above, may be formed on the cheeks of half-shells 11, 12 covering spoke 3, and may, for example, extend crosswise to spoke 3, i.e. circumferentially with respect to steering wheel 1. Half-shells 11, 12 may also, of course, be of any circumferential extension, even to the point of covering the whole circumference of steering wheel 1; and the outer lateral surfaces of half-shells 11, 12 may obviously be finished in any known manner, in particular, by applying a coat of paint 28.

According to a further aspect of the invention, steering wheel 1 may also comprise a known marketed electric resistance heating element 30 (shown schematically only in FIG. 1 for the sake of simplicity) made, for example, of mesh, cloth or sponge with built-in electric resistors connectable to an external source, and which is wound about outer cover layer 6 of structure 2, beneath or incorporated in layer 9 of impregnated cloth 10. The electric resistors may, of course be simply incorporated in cloth 10 of layer 9.

According to the present invention, steering wheel 1 as described above is formed as follows. To begin with, supporting structure 2 of steering wheel 1, comprising metal core 5 and outer cover layer 6 of polymer material, is formed in substantially known manner; and the two diametrically-opposite circumferential grooves 7 described above, or other equivalent recessed portions permitting thermal expansion of the polymer material of outer cover layer 6, are formed in known manner in outer cover layer 6.

Apart, curved preformed half-shells 11, 12 for covering each portion 4 into which structure 2 is divided are formed of appropriate shape and size, for example, from sheets of multilayer sandwich composite material comprising an inner layer of wood and an outer surface layer of valuable material (e.g. brier, carbon fiber, etc.) bonded to each other via the interposition of one or more layers of cloth impregnated with polymer adhesives, e.g. epoxy or, better still, melamine resins. The sheets are placed inside specially shaped molds for molding into the shape of half-shells 11, 12.

Purely by way of a non-limiting example, half-shells 11, 12 are prepared as follows. For each half-shell to be produced, a corresponding multilayer package is prepared comprising: an inner sheet of wood (tulipiè) which is eventually placed contacting layer 9 of impregnated cloth 10; a sheet of gauze (commercial woven glass or polyester fiber gauze) preimpregnated with melamine resin; a further sheet of wood (tulipiè); a further two sheets of preimpregnated gauze; and a final layer of brier, to a total thickness of about 2 mm. As compared with other resins (particularly accelerated epoxy resins), materials preimpregnated with melamine resin have the advantage of being storable at ambient temperature with no particular precautions required once impregnated with liquid melamine resin, the sheets of gauze (or other cloth) are oven-dried to remove the solvents with which the resin is normally sold, but without initiating the polymerization reaction, so that the resulting preimpregnated material is ready for use to form the packages, described above, from which to form half-shells 11, 12. Moreover, materials preimpregnated with melamine resin require no catalysts or accelerators for the polymerization reaction, which takes place entirely when forming half-shells 11, 12.

Purely by way of a non-limiting example, the process parameters for molding half-shells 11, 12 may be as follows:
  average mold temperature: 120–180° C. (polymerization temperature: about 130° C. )
  pressing time: 100–350 seconds
  mold closing pressure: 30–100 bar Once formed, half-shells 11, 12 may obviously be cut, milled or otherwise worked in any known manner.

By means, for example, of a substantially known bandaging machine, structure 2 is wound, over outer cover layer 6, with at least one layer 9 of cloth 10 (preferably glass or polyester gauze) impregnated with polymer (preferably epoxy) resin and designed, according to the invention, to ensure adhesion of half-shells 11, 12 to each other and to the underlying outer cover layer 6. Layer 9 of cloth 10 may be preimpregnated with polymer resin before being wound onto outer cover layer 6, or may be impregnated with polymer resin after being wound onto outer cover layer 6, but obviously prior to application of preformed half-shells 11, 12. Whichever the case, preformed half-shells 11, 12 are then applied on layer 9 of impregnated cloth 10 to form substantially continuous, tubular shell 13 covering portion 4 or structure 2. Finally, a polymerization reaction is produced of the polymer resin with which cloth 10 is impregnated, to bond half-shells 11, 12 to each other and, via the interposition of layer 9 of cloth 10, to outer cover layer 6 of structure 2.

The step to produce the polymerization reaction of the polymer resin with which layer 9 of cloth 10 is impregnated, and to bond half-shells 11, 12 to each other and to structure 2, is performed in a heated, e.g. aluminium, mold into which structure 2, complete with preformed half-shells 11, 12, is inserted; and the mold is brought to and maintained for a predetermined time at a sufficient temperature to produce the polymerization reaction of the polymer resin with which cloth 10 is impregnated. As will be obvious to an expert in the field, the operating conditions at this step depend on the type of polymer resin used. For example, using glass gauze impregnated with Corepox 2007 epoxy resin marketed by ALCA Resine S.r.l., the process parameters may be as follows:

- type of resin: Corepox 2007 (epoxy)
- resin/hardener weight ratio: 10:1 to 10:6
- quantity of resin applied: 10 to 60 g/cm$^2$
- polymerization temperature: 100–180° C.
- polymerization time: 3–15 minutes
- mold closing pressure: 3–10 bar At this step, the polymer resin with which cloth 10 is impregnated adheres to inner lateral surfaces 16, 17 and penetrates between end edges 14, 15 of half-shells 11, 12 to substantially form an end-to-end bond. Alternatively, adhesive may obviously be applied directly to end edges 14, 15 of half-shells 11, 12 to bond the end edges together.

The mold is appropriately shaped to impart a predetermined shape to one of or both half-shells 11, 12: in particular, the succession of ridges 20 and impressions 21. Circumferential grooves 7 enable the polymer material of outer cover layer 6 to expand without exerting radial pressure on, and so deforming, half-shells 11, 12; and any further in-service expansion of the polymer material of outer cover layer 6 is also taken up by circumferential grooves 7 to safeguard the uniformity and adhesion of half-shells 11, 12.

As already stated, half-shells 11, 12 may advantageously, though not exclusively, be made of multilayer material with a sandwich structure comprising an outer surface layer of valuable material. Alternatively, half-shells 11, 12 may be made of multilayer composite material of the type described previously, but without the outer surface layer of valuable material; in which case, respective outer surface layers of valuable material, e.g. brier veneer or kevlar, are applied to preformed half-shells 11, 12 after the half-shells are formed apart, e.g. when preformed half-shells 11, 12 have already been applied to layer 9 of impregnated cloth 10.

Obviously, the method described may be followed by standard operations to surface finish tubular shell 13 defined by half-shells 11, 12; which operations may comprise, for example, polishing and varnishing, as well as application of cover 27, e.g. of leather, between tubular shell 13 and connecting portion 8 for connection to spoke 3; which application, as stated, is made possible by continuous annular clinching seat 26.

If provided, heating element 30 is obviously wound onto portion 4 of structure 2, over outer cover layer 6, prior to applying preformed half-shells 11, 12, and prior to or simultaneously with application of layer 9 of cloth 10 so that heating element 30 is either covered by or incorporated in layer 9.

Clearly, changes may be made to the steering wheel and relative fabrication method as described and illustrated herein without, however, departing from the scope of the present invention.

What is claimed:

1. A method of producing a vehicle steering wheel, comprising forming an annular wheel-shaped element by the steps comprising:

(a) forming a supporting structure of a steering wheel;
   (b) applying to said structure at least one outer cover layer of a polymer material of predetermined density;
   (c) forming, apart from and prior to application to said supporting structure, at least one pair of curved preformed half-shells, said preformed half-shells being shaped and sized for application, facing each other, on opposite sides about a predetermined portion of said structure such that, when applied on opposite sides of said structure portion, said preformed half-shells define a substantially continuous, tubular shell covering said structure portion;
   (d) winding at least one layer of cloth, impregnated with a polymer resin, over said outer cover layer;
   (e) applying said at least one pair of preformed half-shells to said at least one layer of impregnated cloth to form said substantially continuous, tubular shell covering said structure portion; and
   (f) producing a polymerization reaction of said polymer resin to bond said preformed half-shells to each other and, using the interposition of said at least one layer of cloth, to said outer cover layer;
      wherein said at least one layer of cloth is impregnated with said polymer resin before application of said preformed half-shells.

2. The method as claimed in claim 1, wherein said outer cover layer is provided with at least one recessed portion permitting thermal expansion of said polymer material.

3. The method as claimed in claim 2, wherein said step of producing said polymerization reaction of said polymer resin is performed in a heated mold, into which said structure, complete with said at least one pair of preformed half-shells, is inserted; said mold being so shaped as to impart a predetermined final shape to said preformed half-shells.

4. The method as claimed in claim 2, wherein said step of forming said supporting structure of said steering wheel comprises forming two diametrically-opposite, circumferential grooves in said outer cover layer which extend longitudinally along substantially the whole extension of said structure portion.

5. The method as claimed in claim 1, wherein said preformed half-shells are made from multilayer composite material comprising an inner layer of wood, at least one intermediate layer of cloth impregnated with a polymer adhesive, and an outer surface layer of valuable material.

6. The method as claimed in claim 1, comprising, after said step of applying said preformed half-shells to said at least one layer of impregnated cloth, a step of:

applying to said preformed half-shells respective outer surface layers of valuable material.

7. The method as claimed in claim 1, wherein said at least one layer of cloth is preimpregnated with said polymer resin before being wound onto said outer cover layer or is impregnated with said polymer resin after being wound onto said outer cover layer, said polymer resin with which said at least one layer of cloth is impregnated being selected from the group consisting of epoxy resins and melamine resins.

8. The method as claimed in claim 1, wherein said preformed half-shells comprise, at respective longitudinal ends, transverse seats for clinching a surface covering, applied visibly to said structure.

9. The method as claimed in claim 1, further comprising, prior to said step of applying said preformed half-shells to said at least one layer of impregnated cloth, a step of:

winding an electric resistance heating element onto said structure portion, over said outer cover layer.

10. The method as claimed in claim 9, wherein said heating element is made of mesh, cloth or sponge having built-in electric resistors, and is wound onto said outer cover layer prior to said at least one layer of impregnated cloth or simultaneously with said at least one layer of impregnated cloth, so that said heating element is covered by said at least one layer of impregnated cloth or is incorporated in said at least one layer of impregnated cloth.

11. The method as claimed in claim 5, wherein said valuable material is brier veneer, kevlar or aluminum.

12. The method as claimed in claim 6, wherein said valuable material is brier veneer, kevlar or aluminum.

13. The method as claimed in claim 7, wherein said at least one layer of cloth is glass or polyester gauze.

14. The method as claimed in claim 8, wherein said surface covering is a leather covering.

15. The method according to claim 1, wherein said supporting structure comprises metal.

16. A method of producing a vehicle steering wheel, comprising forming an annular wheel-shaped element by the steps comprising:

(a) forming a supporting structure of a steering wheel;

(b) applying to said structure at least one outer cover layer of a polymer material of predetermined density;

(c) forming, apart from and prior to application to said supporting structure, at least one pair of curved preformed half-shells shaped and sized to fit, facing each other, on opposite sides about a predetermined portion of said structure, so as to define a substantially continuous, tubular shell covering said structure portion;

(d) winding at least one layer of cloth, impregnated with a polymer resin over said outer cover layer;

(e) applying said at least one pair of preformed half-shells to said at least one layer of impregnated cloth to form said substantially continuous, tubular shell covering said structure portion; and (f) producing a polymerization reaction of said polymer resin to bond said preformed half-shells to each other and, using the interposition of said at least one layer of cloth, to said outer cover layer;

wherein said at least one layer of cloth is impregnated with said polymer resin before application of said preformed half-shells; and wherein said outer cover layer is provided with at least one recessed portion permitting thermal expansion of said polymer material.

17. The method according to claim 1, wherein the process consists essentially of the steps (a)–(f).

18. A method of producing a vehicle steering wheel, comprising forming an annular wheel-shaped element by the steps comprising:

(a) forming a supporting structure of a steering wheel;

(b) applying to said structure at least one outer cover layer of a polymer material of predetermined density;

(c) forming, apart from and prior to application to said supporting structure, at least one pair of curved preformed half-shells, said preformed half-shells being shaped and sized for application, facing each other, on opposite sides about a predetermined portion of said structure such that, when applied on opposite sides of said structure portion, said preformed half-shells define a substantially continuous, tubular shell covering said structure portion;

(d1) winding at least one layer of cloth, impregnated with a polymer resin, over said outer cover layer;

(d2) winding an electric resistance heating element, made of mesh, cloth or sponge having built-in electric resistors, onto said cover layer; said heating element being wound onto said cover layer prior to said at least one layer of impregnated cloth or simultaneously with said at least one layer of impregnated cloth, so that said heating element is covered by said at least one layer of impregnated cloth or is incorporated in said at least one layer of impregnated cloth;

(e) applying said at least one pair of preformed half-shells to said at least one layer of impregnated cloth provided with said electric resistance heating element to form said substantially continuous, tubular shell covering said structure portion; and (f) producing a polymerization reaction of said polymer resin to bond said preformed half-shells to each other and, using the interposition of said at least one layer of cloth, to said outer cover layer;

wherein said at least one layer of cloth is impregnated with said polymer resin before application of said preformed half-shells.

* * * * *